US012771292B2

(12) United States Patent
Morley et al.

(10) Patent No.: US 12,771,292 B2
(45) Date of Patent: Oct. 20, 2026

(54) DETECTION OF SENSOR ANOMALIES IN PHOTOVOLTAIC POWER SYSTEMS

(71) Applicant: Florida Power & Light Company, Juno Beach, FL (US)

(72) Inventors: James U Morley, Port St. Lucie, FL (US); Mario D. Ibanez, Concord, NC (US); Sriharsha Veeramachaneni, Minneapolis, MN (US); Joel F. Walker, Lunenburg, MA (US)

(73) Assignee: Florida Power & Light Company, Juno Beach, FL (US)

( * ) Notice: Subject to any disclaimer, the term of this patent is extended or adjusted under 35 U.S.C. 154(b) by 0 days.

(21) Appl. No.: 19/021,617

(22) Filed: Jan. 15, 2025

(65) Prior Publication Data

US 2026/0205055 A1 Jul. 16, 2026

(51) Int. Cl.
*H02S 50/10* (2014.01)

(52) U.S. Cl.
CPC ............... *H02S 50/10* (2014.12); *Y04S 10/52* (2013.01)

(58) Field of Classification Search
CPC ................................. H02S 50/10; Y04S 10/52
See application file for complete search history.

(56) References Cited

U.S. PATENT DOCUMENTS

| | | | | |
|---|---|---|---|---|
| 9,322,951 | B2 | 4/2016 | Herzig et al. | |
| 9,939,485 | B1 * | 4/2018 | Johnson | G08B 21/182 |
| 11,693,152 | B2 | 7/2023 | Hoff | |
| 2018/0034411 | A1 * | 2/2018 | Charles | H02S 50/10 |
| 2021/0018347 | A1 * | 1/2021 | Khoury | G01D 21/02 |

FOREIGN PATENT DOCUMENTS

| | | |
|---|---|---|
| CN | 112686443 A | 4/2021 |

* cited by examiner

*Primary Examiner* — Angelo Trivisonno
(74) *Attorney, Agent, or Firm* — Fish & Richardson P.C.

(57) ABSTRACT

Employing artificial intelligence to detect anomalies associated with plane of array irradiance (POAI) sensors at photovoltaic (PV) power systems is discussed. One example is a method that includes determining, via analyzing plane of array irradiance (POAI) sensor data from a POAI sensor of a PV system with a trained classifier, that the POAI sensor data corresponds to a scenario of a set of scenarios. The set of scenarios comprises a sensor anomaly scenario and one or more of a clear sky scenario, an overcast scenario, or a mix of sun and cloud scenario, and the sensor anomaly scenario characterizes a decreased effectiveness of the POAI sensor. The method also includes, in response to determining that the POAI sensor data corresponds to the sensor anomaly scenario: generating an alert that indicates a sensor anomaly at the POAI sensor; and replacing the POAI sensor data with substitute data.

16 Claims, 5 Drawing Sheets

DETECTION OF SENSOR ANOMALIES IN PHOTOVOLTAIC POWER SYSTEMS

TECHNICAL FIELD

This description relates to systems and methods for determining whether an anomaly has occurred with a plane of array irradiance (POAI) sensor at a photovoltaic power system by using artificial intelligence.

BACKGROUND

A photovoltaic (PV) power system generates power by converting light incident on PV cells of the PV power system to electricity. The amount of light incident on the PV power system depends on multiple factors, including the weather conditions, the position of the sun, whether there are obstructions blocking the light, and the angle of the PV cells relative to the sun. Various PV solar systems use sensors such as plane of array irradiance (POAI) sensors to measure the potential energy yield of the PV power system and determine how efficiently the PV power system is performing.

SUMMARY

A first example relates to a non-transitory machine-readable medium having machine executable instructions for an anomaly detection system that causes a processor core to execute operations. The operations include determining, via analyzing plane of array irradiance (POAI) sensor data from a POAI sensor of a photovoltaic (PV) system with a trained classifier, that the POAI sensor data corresponds to a scenario of a set of scenarios. The set of scenarios comprises a sensor anomaly scenario and one or more of a clear sky scenario, an overcast scenario, or a mix of sun and cloud scenario, and the sensor anomaly scenario characterizes a decreased effectiveness of the POAI sensor. The operations also include, in response to determining that the POAI sensor data corresponds to the sensor anomaly scenario: generating an alert that indicates a sensor anomaly at the POAI sensor; and replacing the POAI sensor data with substitute data.

A second example relates to an anomaly detection system. The system includes a memory for storing machine-readable instructions and a processor core for accessing the machine-readable instructions and executing the machine-readable instructions as operations. The operations include determining, via analyzing plane of array irradiance (POAI) sensor data from a POAI sensor of a photovoltaic (PV) system with a trained classifier, that the POAI sensor data corresponds to a scenario of a set of scenarios. The set of scenarios comprises a sensor anomaly scenario and one or more of a clear sky scenario, an overcast scenario, or a mix of sun and cloud scenario, and the sensor anomaly scenario characterizes a decreased effectiveness of the POAI sensor. The operations also include, in response to determining that the POAI sensor data corresponds to the sensor anomaly scenario: generating an alert that indicates a sensor anomaly at the POAI sensor and replacing the POAI sensor data with substitute data.

A third example relates to a system for training an anomaly detection system. The system includes a memory for storing machine-readable instructions and a processor core for accessing the machine-readable instructions and executing the machine-readable instructions as operations. The operations include collecting, for a sensor anomaly scenario of a set of scenarios, first irradiance data associated with the sensor anomaly scenario and the PV system. The operations also include collecting, for an additional scenario of a set of scenarios, second irradiance data associated with the additional scenario and the PV system. The additional scenario is one of a clear sky scenario, an overcast scenario, or a mix of sun and cloud scenario. The operations additionally include training the classifier based on the first irradiance data and the second irradiance data to classify the POAI sensor data among the set of scenarios.

DETAILED DESCRIPTION

Figure 1:
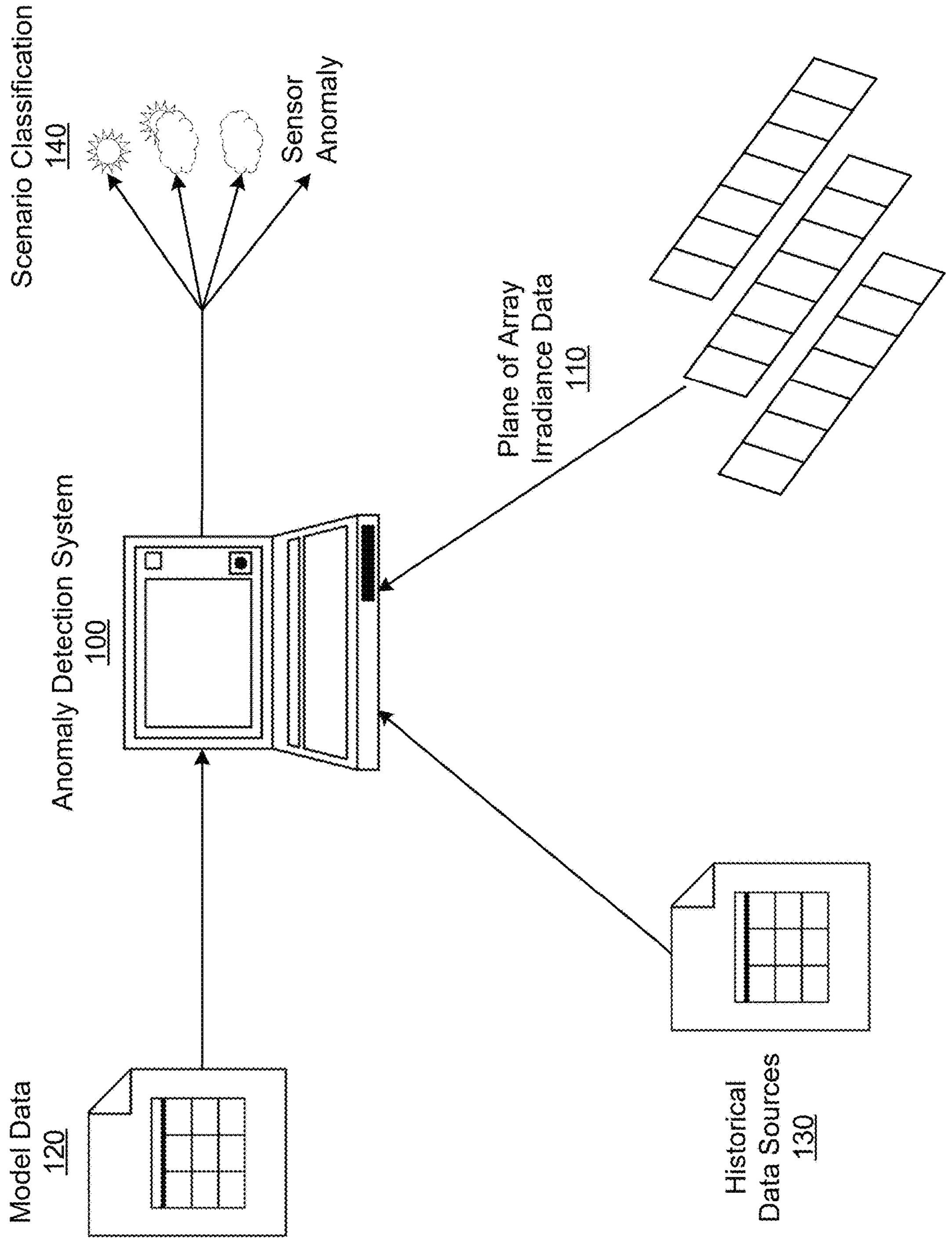
FIG. 1 illustrates a diagram showing an anomaly detection system that classifies plane of array irradiance (POAI) data from a PV system as corresponding to a scenario such as a sensor anomaly or a type of weather.

Modern solar PV operational monitoring systems rely on accurate measurements of POAI in order to detect system sub-performance. When POAI sensors fail, drift or experience other anomalies, PV operational monitoring systems are less able to detect underperformance which leads to lost operator revenue. POAI sensor anomalies include device malfunctions, shading by physical obstructions, situations where material like snow, debris or organic matter fall onto the sensor, and when the sensor is mounted on a malfunctioning tracker system. POAI sensor anomalies often go undetected for longer periods of time at smaller distributed generation (DG) scale solar PV sites because these sites lack on-site technicians, do not have redundant POAI sensors, and may not collect tracker tilt angle measurements.

On clear sky days, and when POAI sensor anomalies are absent, there is a general morning/afternoon symmetry in the plane of array irradiance (POAI) data for fixed axis PV systems facing due south (i.e. 180 degrees azimuth) and north-south aligned single axis tracking systems. The symmetrical pattern to the time series data is on either side of solar noon (e.g., when the sun is due south in the northern hemisphere, etc.). When POAI sensor anomalies occur, the diurnal symmetry is distorted. POAI sensor anomalies occur when the sensor is mounted on a malfunctioning single axis tracker, when snow falls onto and/or melts off the sensor or due to sensor malfunction or sensor shading by nearby objects. These anomalies create an asymmetry in the diurnal POAI time series which is most noticeable on clear sky days. POAI sensor anomalies are often difficult to identify because: (1) there is often a lack of redundant POAI sensors installed on DG sites, (2) because there are no tracker tilt angle/fault tags setup to flag when the tracker holding the POAI sensor malfunctions, and/or (3) because there are generally no technicians regularly on site to monitor the sensors.

Various examples train an artificial intelligence (AI) model based on POAI data as well as other data sources that model performance of the solar system in multiple scenarios to identify those scenarios. The data sources used to train various examples can include data from models, such as clear sky models of diffuse irradiance, GHI (Global Horizontal Irradiance), and/or POAI at the solar system. The data sources can also include data from satellite sources, such as satellite GHI, POAI and/or diffuse irradiance data. Sensors at the site of the solar system, such as on-site POAI, diffuse and/or GHI sensors, are another potential source of data. Additionally, data from sensors at external PV system sites near the solar system (e.g., nearby-site POAI, diffuse and/or GHI sensors, etc.) can be used. In various examples, meteorological information (e.g., published in local weather reports, etc.) and/or on-site camera images are used as data sources. The scenarios include clear sky performance, overcast performance, performance during mix of sun and cloud (e.g., a mix of sunny and cloudy weather, and performance due to sensor anomalies (e.g., mechanical issues, covered sensor, etc.).

In various examples, the trained AI model analyzes POAI data from a solar system for a given day to determine what scenario that day corresponds to, such as overcast, mix of sun and cloud, clear sky, or a sensor anomaly. The sensor anomaly scenario(s) covers various scenarios that characterize a decreased effectiveness of the POAI sensor, such as being covered in snow or otherwise obscured, failure of a tracker on which the POAI sensor is mounted, malfunction of the POAI sensor, etc.

In response to a determination that the POAI data corresponds to a sensor anomaly, various examples send an alert (e.g., to a site manager) to investigate the POAI sensor. Additionally, in response to a determination of a sensor anomaly, the POAI sensor data for that day is replaced in various examples with alternative data that provides a more accurate estimate of potential power generation. Depending on the example and/or available data, alternative data can include data from another on-site POAI sensor, on-site GHI data converted to POAI data, POAI or GHI data from a nearby site, a fill model to estimate accurate POAI data based on the recorded POAI data, and/or POAI data determined from a satellite model.

Examples provide multiple advantages over conventional techniques for detecting underproduction at PV power systems, especially at DG systems. Because many DG systems lack redundant sensors, tracker tilt angle/fault tags, and permanent on-site technicians, conventional techniques often fail to detect PV system underproduction due to POAI sensor anomalies. Various examples detect sensor anomalies at a PV power system based on classifying POAI sensor data as corresponding to various scenarios that include various weather conditions affecting energy production (e.g., clear sky, mix of sun and cloud, or overcast) as well as one or more sensor anomaly scenarios. Additionally, various examples generate alerts to users that indicate detected sensor anomalies to facilitate resolution of sensor anomalies. Various examples also replace sensor data associated with a sensor anomaly with alternative data that more accurately reflects potential energy production at the PV power system.

Referring to FIG. 1, illustrated is a diagram showing an anomaly detection system 100 that classifies plane of array irradiance (POAI) data 110 from a PV power system as corresponding to a scenario of a set of scenarios. The anomaly detection system 100 employs an AI trained on data (from one or more data sources) associated with various scenarios of the set of scenarios.

The data sources used in various examples can include model data 120, such as one or more clear sky irradiance models based on the location of the PV system. The clear sky model(s) estimate GHI, Diffuse, POAI irradiance data at the PV system, for clear sky (i.e. cloudless) days throughout the year based on sun-earth position (e.g., based on the latitude of the PV system, etc.) and various non-cloud atmospheric conditions like aerosols, ozone, etc. In various examples, the model data 120 includes POAI model data, global horizontal irradiance (GHI) model data, and/or diffuse irradiance model data (e.g., data that quantifies irradiance from directions other than a direction of the sun, including Rayleigh scattered light, light from clouds, etc.). In various examples, the model data 120 additionally includes data modelling non-clear sky scenarios.

The data sources used in various examples can also include historical data 130 for the location of the PV system or nearby locations (e.g., locations with similar tilt and/or azimuth, such as a common tilt angle and/or common azimuth between the PV system and at least one additional PV system, etc.). The historical data 130 used in various examples can include irradiance data from satellite vendors (e.g., GHI and/or diffuse irradiance, POAI, etc.) at or near the location of the PV system for various days and/or times of year. Additionally, or alternatively, the historical data 130 includes data from sensors at the PV power system (e.g., the POAI sensor generating the POAI data 110, other on-site POAI sensor(s), and/or on-site GHI and Diffuse sensors) and/or nearby locations (e.g., POAI and/or GHI and Diffuse sensors at nearby locations, etc.).

The training data (e.g., from the model data 120 and/or the historical data 130) includes datasets (e.g., data from a given source for a given day and/or location, such as POAI sensor data from a nearby site for a given day, etc.) that are associated with a scenario of the set of scenarios (e.g., clear sky model data is associated with a clear sky scenario, historical data is associated with scenarios based on user labeling, etc.). In various examples, data from the model data 120 and/or the historical data 130 is represented similarly, for example, as POAI data with the same time resolution (e.g., one minute, etc.). In examples where there is data with differing time resolutions, interpolation or other techniques are useable to represent the data with the same time resolution. In examples where non-POAI data (e.g., GHI data, diffuse irradiance data, etc.) from the model data 120 and/or the historical data 130 is employed, non-POAI data can be converted to POAI data, for example, via a transposition model. Various examples train the anomaly detection system 100 based on the training data (e.g., from the model data 120 and/or the historical data 130) and associated scenarios to determine a scenario classification 140 associated with the POAI data 110. Based on the POAI data 110 and the set of scenarios on which the anomaly detection system 100 was trained, the scenario classification 140 can be a weather scenario (e.g., clear sky, mix of sun and cloud, overcast, etc.) or a sensor anomaly scenario (e.g., a single scenario covering all sensor anomalies, or one of a plurality of different sensor anomaly scenarios, such as an obstruction, snow on the sensor, mechanical failure, sensor malfunction, etc.).

Figure 2:
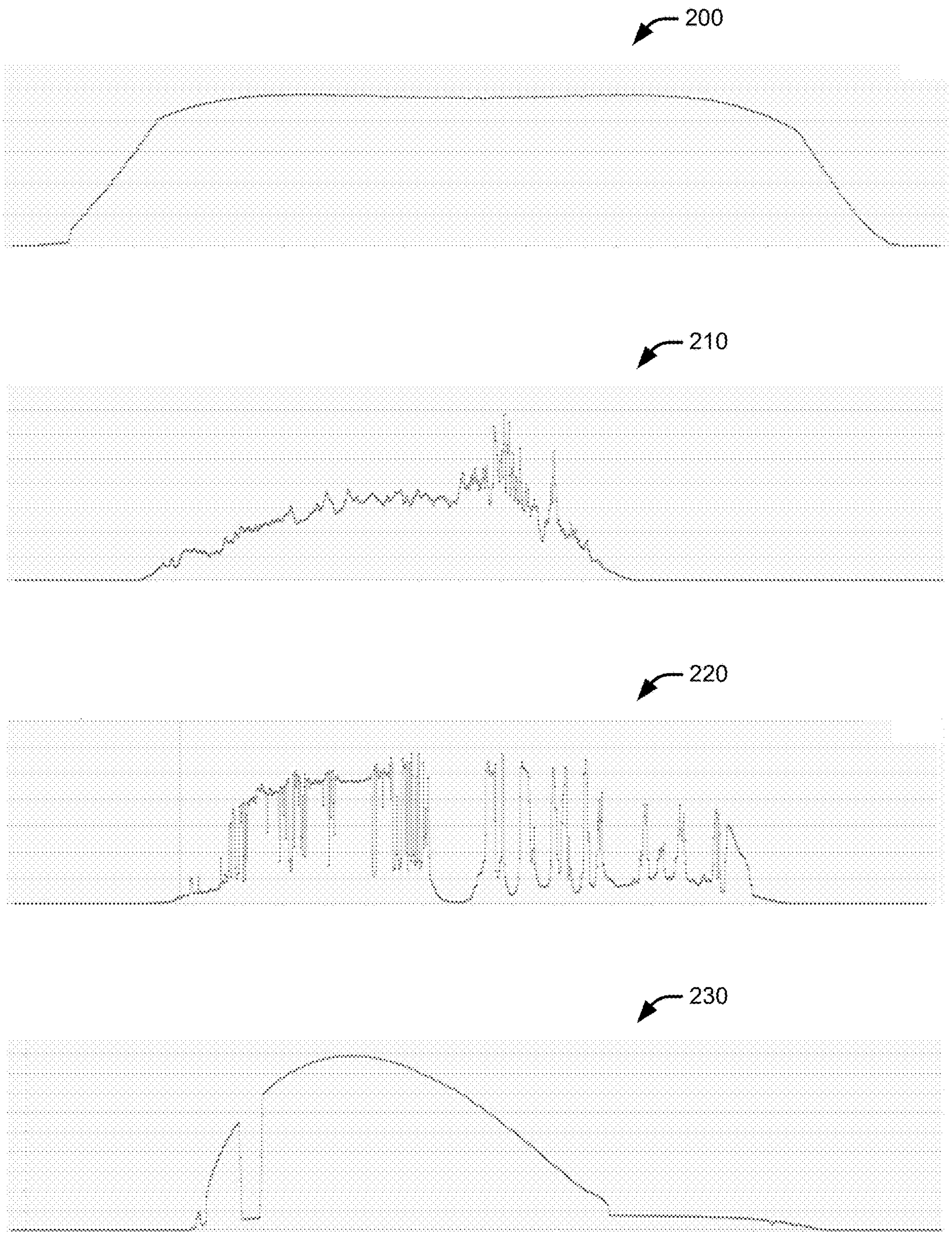
FIG. 2 illustrates example POAI data for a clear sky scenario, a mix of sun and cloud scenario, an overcast scenario, and a sensor anomaly scenario.

In a first set of examples, the anomaly detection system 100 is trained to classify POAI data into one of four scenarios: clear sky, overcast, mix of sun and cloud, or sensor anomaly. Referring to FIG. 2, illustrated are four example images 200-230 of POAI data for days associated with clear sky, overcast, mix of sun and cloud, and sensor anomaly scenarios. Image 200 shows an example of POAI data for a clear sky scenario. Image 210 shows an example of POAI data for an overcast scenario. Image 220 shows an example of POAI data for a mix of sun and cloud scenario. Image 230 shows an example of POAI sensor anomaly data during a clear sky scenario.

The anomaly detection system 100 in the first set of examples is trained to recognize POAI data corresponding to a clear sky scenario. The data sources (e.g., from the model data 120 and the historical data 130, etc.) used to train the anomaly detection system 100 for the clear sky scenario can vary between examples (e.g., based on available data, differences in model data 120 or historical data 130 based on differences between locations of PV power systems, etc.).

For example, using a clear sky model, the POAI is calculated for the location of the PV power system for all days during one year (or some subset thereof). In various examples, average values are used for estimating the atmospheric conditions at the site of the PV system. In various examples, if available in the historical data 130, the anomaly detection system 100 is also trained on clear sky POAI data from the site for days when the POAI sensor was operating correctly and/or POAI data from a satellite provider. Additionally, various examples train the anomaly detection system 100 to recognize the changes in POAI due to seasonal variation by providing the anomaly detection system 100 with the date (e.g., day and month; day, month, and year; etc.) associated with the POAI values.

Based on the available clear sky data, the anomaly detection system 100 is trained to recognize the diurnal clear sky irradiance profile for all days during a given year for the site of the PV power system. For a clear sky day, the POAI data should have a ‘dual hump’ pattern for single axis tracker (SAT) PV sites and more of a ‘bell shape’ pattern for fixed axis PV sites. Additionally, for a clear sky day, the POAI pattern should be roughly symmetrical around solar noon. FIG. 2 illustrates one example of a clear sky POAI series for a SAT site in the image 200, showing the characteristic ‘dual hump’ pattern and symmetry around solar noon.

Various examples of the first set of examples include additional factors (e.g., variables, characteristics, etc.) of clear sky POAI data in training the anomaly detection system 100. For example, for a clear sky day, the measured POAI will approximate the clear sky modelled POAI, and the daily insulation from both will be similar in magnitude. As another example, the diurnal POAI time series for a clear sky day is smooth and lacking in large changes over a short (e.g., minute-by-minute, etc.) time frame. The clear sky POAI index is a ratio between the daily measured POAI insolation and the daily clear sky model POAI insolation. In various examples, factors used in determining whether the POAI data corresponds to a clear sky scenario include whether the clear sky index is greater than a threshold value (e.g., 80-90%, 85%, etc.). Another factor considered in various examples is the number of variable minutes in the POAI data during the day. Variable minutes are defined as minutes where the POAI of that minute differs by more than a threshold amount or ratio (e.g., 10-20%, 15%, etc.) from the POAI of the previous minute. In various examples, whether the number of variable minutes is greater than a threshold value (e.g., 3-7%, 5%, etc.) is a factor considered in determining whether the day is a ‘clear sky’ day and associated with the clear sky scenario.

The anomaly detection system 100 in the first set of examples is further trained to recognize POAI data corresponding to an overcast scenario. The data sources (e.g., from the model data 120 and the historical data 130, etc.) used to train the anomaly detection system 100 for the overcast scenario can vary between examples (e.g., based on available data, differences in model data 120 or historical data 130 based on differences between locations of PV power systems, etc.). In various examples, the anomaly detection system 100 is trained on actual POAI measurements for overcast days (e.g., based on user labeling, etc.) at the site of the PV power system or nearby site(s) (e.g., with similar tilt, azimuth, orientation, mounting, etc.). The trained anomaly detection system 100 is able to determine whether the diurnal POAI time series for a day corresponds to the overcast scenario. In general, the overcast scenario involves a POAI that is low and relatively stable, with most changes occurring slowly over time with POAI values significantly below POAI values of the clear sky scenario. In various examples, factors used in determining whether the POAI data corresponds to a overcast scenario include whether the clear sky index is less than a threshold value (e.g., 20-25%, 20%, etc.). FIG. 2 illustrates one example of an overcast POAI series for a SAT site in the image 210, showing POAI values substantially below those of the clear sky scenario in the image 200 and with most variations occurring slowly.

Additionally, the anomaly detection system 100 in the first set of examples is trained to recognize POAI data corresponding to a mix of sun and cloud scenario. The data sources (e.g., from the model data 120 and the historical data 130, etc.) used to train the anomaly detection system 100 for the mix of sun and cloud scenario can vary between examples (e.g., based on available data, differences in model data 120 or historical data 130 based on differences between locations of PV power systems, etc.). In various examples, the anomaly detection system 100 is trained on actual POAI measurements for mix of sun and cloud days (e.g., based on user labeling, etc.) at the site of the PV power system or nearby site(s) (e.g., with similar tilt, azimuth, orientation, mounting, etc.). The trained anomaly detection system 100 is able to determine whether the diurnal POAI time series for a day corresponds to the mix of sun and cloud scenario. In general, the mix of sun and cloud scenario involves a POAI that changes rapidly over time. There are many variants of the mix of sun and cloud scenario, but the POAI data generally lacks the ‘dual hump’ (for SAT systems) or ‘bell shaped’ (for fixed axis systems) profile of the clear sky profile, and frequently has more rapid variation and greater maximum POAI than the overcast scenario. FIG. 2 illustrates one example of a mix of sun and cloud scenario POAI series for a SAT site in the image 220, showing POAI values lacking the ‘dual hump’ and symmetry of the clear sky scenario in the image 200 and with more rapid variation than the overcast scenario in the image 210.

The anomaly detection system 100 in the first set of examples is also trained to recognize POAI data 110 corresponding to sensor anomaly scenario(s). The data sources (e.g., from the model data 120 and the historical data 130, etc.) used to train the anomaly detection system 100 for the sensor anomaly scenario(s) can vary between examples (e.g., based on available data, differences in model data 120 or historical data 130 based on differences between locations of PV power systems, etc.). In various examples, the anomaly detection system 100 is trained on actual POAI measurements for days where the POAI sensor data was affected by a sensor anomaly (e.g., based on user labeling, etc.) at the site of the PV power system, nearby site(s) (e.g., with similar tilt, azimuth, orientation, mounting, etc.), or other site(s). The trained anomaly detection system 100 is able to determine whether the diurnal POAI time series for a day corresponds to sensor anomaly scenario(s), which include (e.g., as separate scenarios or combined in one or sensor anomaly scenario(s), etc.): tracker failure, shading of the POAI sensor by nearby obstructions, snow on the POAI sensor, and/or malfunction of the POAI sensor. FIG. 2 illustrates an example of a POAI time series with two sensor anomalies. In the image 230, the POAI sensor is being shaded by an object for a short period of time in the morning followed by an increasing and then decreasing diurnal asymmetry in the time series. The time series lacks the 'dual hump' and symmetry of the clear sky scenario in the image 200.

Tracker failure is a first type of sensor anomaly and potentially occurs at single axis tracker (SAT) sites (but not at fixed axis sites), where the POAI sensor is mounted on a SAT that is not working correctly. If the SAT that holds the POAI sensor is operating normally, the diurnal time series in the POAI data 110 are roughly symmetrical around solar noon on clear sky days and has a dual hump shape. When the tracker with the POAI sensor fails, the clear sky POAI changes slowly over time, but there is usually a large asymmetry between morning and afternoon on clear sky conditions.

Shading of the POAI sensor by nearby obstructions is a second type of sensor anomaly that occurs at PV power systems. If a POAI sensor is free from shading, the clear sky diurnal time series in the POAI data 110 are roughly symmetrical around solar noon. When the sensor is shaded, there is a rapid descent in POAI over several minutes followed by a prolonged flatlined period at low (e.g., diffuse profile) magnitude, followed by a rapid ascent in POAI over several minutes as the shading ends.

Snow on the POAI sensor is a third type of sensor anomaly that occurs at PV power systems. In various examples, weather data (e.g., from regional weather stations, etc.) is included in the data used for training the anomaly detection system 100 and analyzed in connection with POAI data for classifying POAI data 110. In various examples, factors considered by the anomaly detection system 100 include whether snowfall is recorded by regional weather stations and/or snow is possible or likely given known weather data and or snow is visible on the PV panels via the on-site camera. When snowfall accumulates on the sensor, and or melts off during the day, the diurnal time series is not symmetrical around solar noon.

A malfunctioning POAI sensor is a fourth type of sensor anomaly that occurs at PV power systems. When the sensor is not working, the POAI values of the POAI data 110 will often appear to be 'flat lined' or change very little over the course of a day.

The trained anomaly detection system 100 (e.g., trained for a specific PV power system, trained for a set of PV power systems with similar location(s), etc.) receives POAI data 110 from the PV power system for a given day, and analyzes the POAI data 110 to determine a scenario classification 140 associated with the POAI data 110. Based on the POAI data 110 and the set of scenarios on which the anomaly detection system 100 was trained, the scenario classification 140 can be a weather scenario (e.g., clear sky, mix of sun and cloud, overcast, etc.) or a sensor anomaly scenario (e.g., a single scenario covering all sensor anomalies, or one of a plurality of different sensor anomaly scenarios, such as an obstruction, snow on the sensor, mechanical failure, sensor malfunction, etc.). In the first set of examples, the set of scenarios includes a clear sky scenario, an overcast scenario, a mix of sun and cloud scenario, and a sensor anomaly scenario. If the scenario classification 140 determined by the anomaly detection system 100 is a weather scenario (e.g., the clear sky scenario, the overcast scenario, the mix of sun and cloud scenario, etc.), the POAI data 110 is stored as data representing the POAI for the day at the PV power system.

If the scenario classification 140 determined by the anomaly detection system 100 is a sensor anomaly scenario, various examples take additional actions. Depending on the example, additional actions taken in response to the scenario classification 140 being a sensor anomaly scenario include generating an alert and/or replacing the POAI data 110 with other data that more accurately reflects irradiance conditions at the PV power system.

In various examples, in response to the scenario classification 140 determined by the anomaly detection system 100 being a sensor anomaly scenario, an alert is generated and sent to a relevant party (e.g., site manager, etc.) indicating the sensor anomaly. In some examples, the alert indicates a type of sensor anomaly determined based on the POAI data 110 and/or recommends actions to be taken to resolve the sensor anomaly.

Additionally, in various examples, in response to the scenario classification 140 determined by the anomaly detection system 100 being a sensor anomaly scenario, the anomaly detection system 100 replaces the POAI data 110 with substitute data. In various examples, the substitute data is based on one or more of: (1) POAI data from a second POAI sensor at the site of the PV power system (e.g., when POAI data from the second POAI sensor is not associated with a sensor anomaly, etc.), (2) GHI (and Diffuse if available) data measured at the site of the PV power system and converted to POAI, (3) POAI and/or GHI from another site near the PV power system, (4) an estimate of POAI based on a POAI fill model (e.g., substituting the POAI data 110 with the POAI data 110 as modified by a fill model, etc.), and/or (5) an estimate of POAI from a model using satellite-based data. In some examples, different types of substitute data are assigned different priorities (e.g., ordered based on the above listing (1)-(5) of types of substitute data, with POAI data from the second POAI sensor at the site of the PV power system having the highest priority and the estimate of POAI from the model using satellite-based data having the lowest priority, etc.), and the highest priority type of data among available data is selected as the substitute data. Replacing the POAI data with the substitute data in response to a sensor anomaly scenario allows for more accurate determination of the power generation capability of the PV power system on that day. Additionally, replacing the POAI data with the substitute data in response to a sensor anomaly scenario allows monitoring of the PV power system to continue uninterrupted while the sensor anomaly is resolved (e.g., by the site manager, etc.), thereby enhancing the robustness and performance of the PV power system.

In various examples, the anomaly detection system 100 is further trained based on feedback and/or additional data. In a first example, POAI data, GHI data, etc. obtained from the PV power system and/or nearby PV power systems is used to further train the anomaly detection system 100 on an ongoing basis. As another example, in response to the scenario classification 140 being a sensor anomaly, a site manager who resolves the sensor anomaly can provide data regarding the sensor anomaly (e.g., the type of sensor anomaly, etc.), which is used to further train the anomaly detection system 100, improving the classification of future POAI data.

Figure 3:
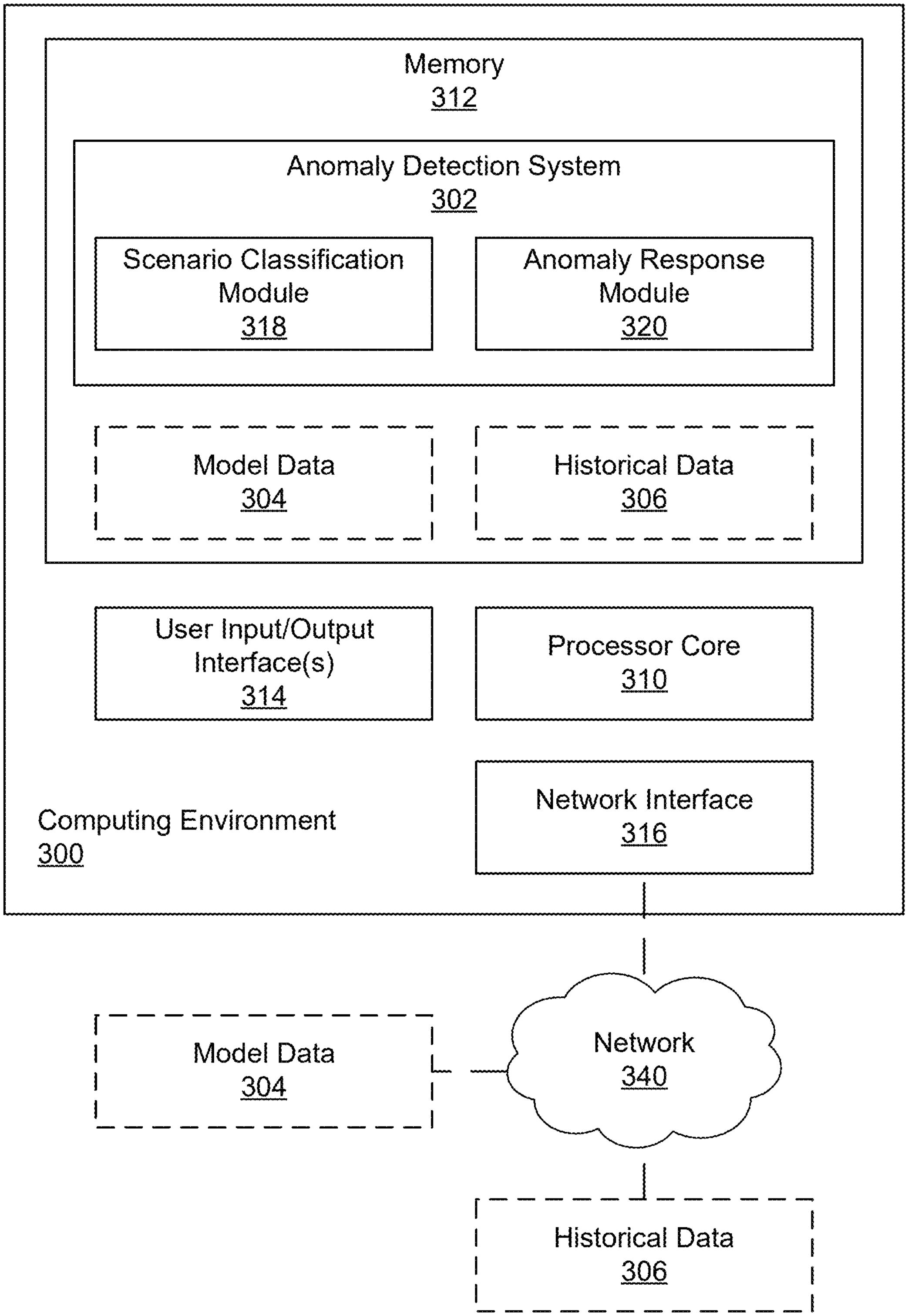
FIG. 3 illustrates an example computing environment for an anomaly detection system.

FIG. 3 illustrates an example computing environment 300 implementing an anomaly detection system 302 (e.g., trained on model data 304 and/or historical data 306, etc., shown at two possible locations in FIG. 3) capable of classifying POAI data (e.g., POAI data for a day from a POAI sensor at a PV power system, etc.) as corresponding to a scenario of a set of scenarios (e.g., a clear sky scenario, an overcast scenario, a mix of sun and cloud scenario, one or more sensor anomaly scenarios, etc.). The computing environment 300 includes a processor core 310, a memory 312, a user input/output (I/O) interface 314, and a network interface 316, which are operably connected for computer communication. The processor core 310 performs general computing to execute instructions stored in the memory 312, including instructions associated with anomaly detection system 302. The instructions cause the processor core 310 to execute operations. The memory 312 also stores instructions associated with an operating system that controls and/or allocates resources of the computing environment 300, including resources associated with the anomaly detection system 100 of FIG. 1. The memory 312 represents a non-transitory machine-readable memory (or other medium), such as random-access memory (RAM), a solid state drive, a hard disk drive or a combination thereof.

The example computing environment 300 implements the anomaly detection system 302, which is employable to implement the anomaly detection system 100 of FIG. 1. The anomaly detection system 302 includes a scenario classification module 318 and an anomaly response module 320. The memory 312 stores machine-readable instructions associated with the scenario classification module 318 and the anomaly response module 320. In various examples, the scenario classification module 318 (e.g., as trained on the model data 304 and/or the historical data 306) analyzes POAI data from a POAI sensor at a PV power system and classifies the POAI data as corresponding to a scenario (e.g., a weather scenario or a sensor anomaly scenario). In response to the scenario classification module 318 classifying the POAI data as corresponding to a sensor anomaly scenario, the anomaly response module 320 generates an alert (e.g., for a site manager of the PV power system, etc.) and/or replaces the POAI data with substitute data.

In various examples, the scenario classification module 318 is trained based on the model data 304 and the historical data 306 to classify POAI data as corresponding to a given scenario of a set of scenarios (e.g., that includes a clear sky scenario, an overcast scenario, a mix of sun and cloud scenario, and at least one sensor anomaly scenario, etc.). The model data 304 includes data from various models (e.g., of types included in model data 120, etc.), such as POAI model data, global horizontal irradiance (GHI) model data, and/or diffuse irradiance model data (e.g., data that models irradiance from directions other than a direction of the sun, including Rayleigh scattered light, light from clouds, etc.). The historical data 306 includes satellite data and/or sensor data for the location of the PV system and/or nearby locations (e.g., locations with similar PV panel tilt and/or azimuth, etc.). In various examples, the satellite data in the historical data 306 includes data from satellite vendors indicating irradiance (e.g., GHI and/or diffuse irradiance, etc.) at or near the location of the PV system for various days and/or times of year. In various examples, the sensor data in the historical data 306 includes data from sensors at the PV power system (e.g., the POAI sensor that scenario classification module 318 is classifying data from, another POAI sensor or a GHI sensor, etc.) and/or nearby locations (e.g., POAI and/or GHI sensors at nearby locations, etc.).

Depending on the example, the model data 304 and/or the historical data 306 can be stored locally to (e.g., stored within the memory 312, as shown in FIG. 3), remotely from (e.g., connected via the network 340, as shown in FIG. 3), or a combination of locally to and remotely from the computing environment 300. In various examples, the model data 304 and/or historical data 306 includes data used to train the scenario classification module 318 to classify scenarios at a single PV power system and/or data used to train the scenario classification module 318 to classify scenarios at two or more PV power systems (e.g., PV power systems that are within a threshold distance of each other, that have similar azimuth/tilt, etc.).

The processor core 310 accesses the memory 312 and executes the machine-readable instructions as operations. The processor core 310 can be a variety of various processors including multiple single- and multi-core processors, co-processors, and other multiple single and multicore processor and co-processor architectures. The user I/O interface 314 provides software and hardware to facilitate data input and output between the computing environment 300 and a user. This can include input devices such as a keyboard, mouse, touchpad, touchscreen, microphone, etc., as well as output devices such as display(s) (e.g., light-emitting diode (LED) display panel(s), liquid crystal display (LCD) panel (s), plasma display panel(s), and/or touch screen display(s), etc.), speaker(s), etc. The user I/O interface 314 provides graphical input controls for a user interface, which can include software and hardware-based controls, interfaces, touch screens, or touch pads or plug and play devices for a user to provide user input.

The network interface 316 provides software and hardware to facilitate data input to (e.g., POAI data to be classified, etc.) and output from (e.g., scenario classifications from the scenario classification module 318, alerts from the anomaly response module 320, etc.) the computing environment 300. The memory 312 includes the anomaly detection system 302 that includes modules 318 and 320 that operate in concert and/or stages to identify and respond to sensor anomalies.

In response to the scenario classification module 318 classifying the POAI data as corresponding to a sensor anomaly scenario, the anomaly response module 320 in various examples generates an alert (e.g., to a site manager, etc.) indicating the sensor anomaly (e.g., and in some examples, additional information to resolve the sensor anomaly, such as the type of sensor anomaly, etc.) and/or replaces the POAI data classified by the scenario classification module 318 with substitute data (e.g., data obtained from other POAI sensor(s) at the PV power system, GHI (and Diffuse if available) data obtained at the PV power system and converted to POAI data, POAI/GHI/Diffuse data from another nearby PV power system, POAI fill model estimate data, POAI data from a model based on satellite data, etc.).

Figure 4:
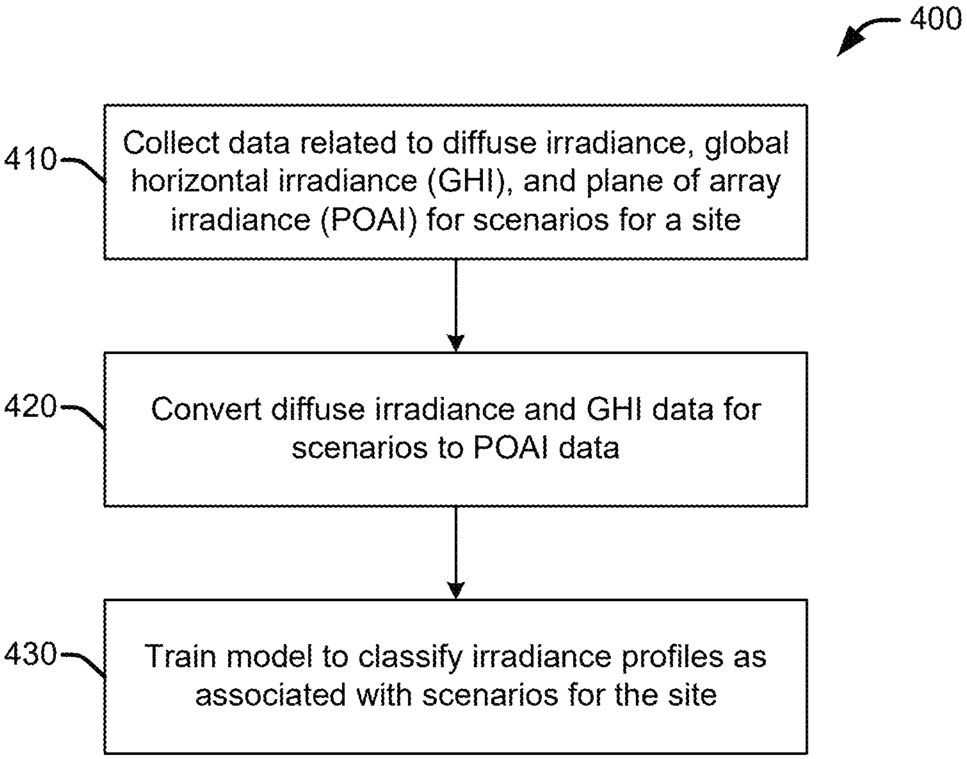
FIG. 4 illustrates a flowchart of an example method for training an anomaly detection system to classify POAI data as corresponding to a scenario such as a sensor anomaly or a type of weather.
Figure 5:
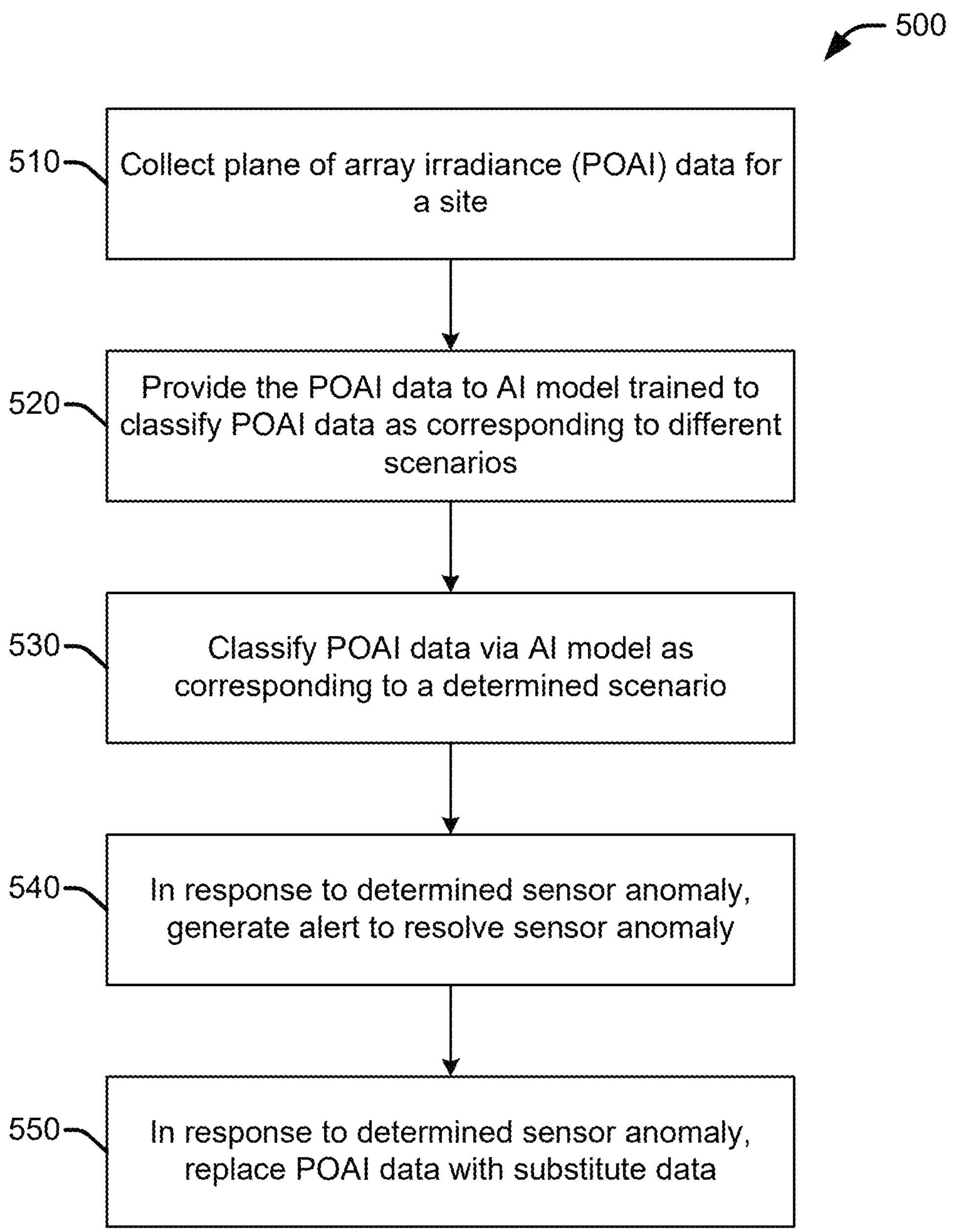
FIG. 5 illustrates a flowchart of an example method for classifying POAI data from a PV system as corresponding to a scenario such as a sensor anomaly or a type of weather.

In view of the foregoing structural and functional features described above, example methods will be better appreciated with reference to FIGS. 4 and 5. While, for purposes of simplicity of explanation, the example methods of FIGS. 4-5 are shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

Referring to FIG. 4, illustrated is a flow diagram of a method 400 for training an anomaly detection system to classify plane of array irradiance (POAI) data as corresponding to a scenario of a set of scenarios. In other examples, the blocks of the example method 400 are a set of machine-readable instructions on a non-transitory machine-readable medium or are a set of machine-executable operations performed by a processor executing machine-readable instructions as the operations.

At block 410, the method 400 includes collecting (e.g., via anomaly detection system 100, computing environment 300, anomaly detection system 302, etc.) irradiance data (e.g., model data such as model data 120 or model data 304, historical data such as historical data 130 or historical data 306, etc.) associated with a set of scenarios at a PV power system. In various examples, the set of scenarios includes at least one sensor anomaly scenario and at least one other scenario (e.g., a clear sky scenario, an overcast scenario, a mix of sun and cloud scenario, etc.). The data includes one or more of POAI data, GHI data, and/or diffuse irradiance data. Historical data (e.g., historical data 130, historical data 306, etc.) used in various examples includes data from sensor(s) at the PV power system and/or nearby PV power systems (e.g., within a threshold distance and/or with similar tilt/azimuth, etc.). Additionally, historical data used in some examples includes data obtained from satellite provider(s). In various examples, the collected data (e.g., model data and/or historical data, etc.) includes one or more datasets along with the date(s) (e.g., day and/or month, etc.) of the one or more datasets.

At block 420, the method 400 includes converting (e.g., via anomaly detection system 100, computing environment 300, anomaly detection system 302, etc.) diffuse irradiance data and/or GHI data of the data collected at block 410 to POAI data. At block 430, the method 400 includes training a classifier (e.g., of anomaly detection system 100, computing environment 300, anomaly detection system 302, etc.) to classify POAI sensor data as corresponding to a scenario based on the data collected at block 410 (e.g., which in some examples includes diffuse irradiance data and/or GHI data converted to POAI data at block 420, etc.).

FIG. 5 illustrates a flowchart of an example method 500 for classifying plane of array irradiance (POAI) data into a scenario of a set of scenarios via an anomaly detection system (e.g., anomaly detection system 100, anomaly detection system 302, etc.). In other examples, the blocks of example method 500 are a set of machine-readable instructions on a non-transitory machine-readable medium or are a set of machine-executable operations performed by a processor executing machine-readable instructions as the operations.

At block 510, the method 500 includes collecting (e.g., via anomaly detection system 100, computing environment 300, anomaly detection system 302, etc.) POAI data (e.g., POAI data 110, etc.) from a POAI sensor at a PV system. At block 520, the method 500 includes providing the POAI data to an AI model (e.g., of anomaly detection system 100, anomaly detection system 302, etc.) trained to classify POAI data as corresponding to a scenario of a set of scenarios (e.g., including one or more sensor anomaly scenarios that characterize a decreased effectiveness of the POAI sensor and one or more weather scenarios such as a clear sky scenario, an overcast scenario, and/or a mix of sun and cloud scenario, etc.).

At block 530, the method 500 includes determining (e.g., via the anomaly detection system 100, the scenario classification module 318, etc.) that the POAI data corresponds to a scenario (e.g., a weather scenario, a sensor anomaly scenario, etc.) of the set of scenarios. In response to a determination at block 530 that the POAI data corresponds to a sensor anomaly scenario, one or more actions are taken. At block 540, the method 500 includes generating (e.g., via the anomaly detection system 100, the anomaly response module 320, etc.) an alert (e.g., to a site manager associated with the PV power system, etc.) indicating a sensor anomaly. At block 550, the method 500 includes replacing (e.g., via the anomaly detection system 100, the anomaly response module 320, etc.) the POAI data with substitute data that better reflects the actual irradiance conditions at the PV power system, as the POAI data is affected by the sensor anomaly. In various examples, the substitute data is based on one or more of: (1) POAI data from a second POAI sensor at the site of the PV power system (e.g., when POAI data from the second POAI sensor is not associated with a sensor anomaly, etc.), (2) GHI (and diffuse if available) data measured at the site of the PV power system and converted to POAI, (3) POAI and/or GHI (and diffuse if available) from another site near the PV power system, (4) an estimate of POAI based on a POAI fill model (e.g., substituting the POAI data 110 with the POAI data 110 as modified by a fill model, etc.), and/or (5) an estimate of POAI from a model using satellite-based data.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Also as used herein, the term "set" means one or more elements (e.g., where the elements can be anything, such as datasets, nodes, relationships, etc.), and a "subset" of a set A refers to any set B where every element of set B is an element of set A (note that every set A is a subset of itself, as every element of set A is an element of set A). Similarly, a "proper subset" of set A refers to a set B that does not include every member of the set A, such that set A and set B are not equal. Additionally, where the disclosure or claims recite "a," "an," "a first," or "another" element, or the equivalent thereof, it should be interpreted to include one or more than one such element, neither requiring nor excluding two or more such elements.

In this description, unless otherwise stated, "about," "approximately" or "substantially" preceding a parameter means being within +/−10 percent of that parameter. Modifications are possible in the described embodiments, and other embodiments are possible, within the scope of the claims.

What is claimed is:

1. A non-transitory machine-readable medium having machine executable instructions for an anomaly detection system that causes a processor core to execute operations, the operations comprising:

determining, via analyzing plane of array irradiance (POAI) sensor data from a POAI sensor of a photovoltaic (PV) system with a trained classifier, that the POAI sensor data corresponds to a scenario of a set of scenarios, wherein the set of scenarios comprises a sensor anomaly scenario and one or more of a clear sky scenario, an overcast scenario, or a mix of sun and cloud scenario, and the sensor anomaly scenario characterizes a decreased effectiveness of the POAI sensor; and in response to determining that the POAI sensor data corresponds to the sensor anomaly scenario:

generating an alert that indicates a sensor anomaly at the POAI sensor; and replacing the POAI sensor data with substitute data.

2. The non-transitory machine-readable medium of claim 1, wherein the PV system is one of a single axis tracker PV system or a fixed axis PV system.

3. The non-transitory machine-readable medium of claim 1, wherein the sensor anomaly is one of a tracker failure of the POAI sensor, an obstruction shading the POAI sensor, snow or debris on the POAI sensor, or a malfunction of the POAI sensor.

4. The non-transitory machine-readable medium of claim 1, wherein the substitute data comprises additional POAI sensor data from an additional POAI sensor of the PV system.

5. The non-transitory machine-readable medium of claim 1, wherein the substitute data comprises additional POAI sensor data from an additional POAI sensor of an external PV system that is within a threshold distance from the PV system, wherein the PV system and the external PV system have a common PV panel tilt and a common azimuth.

6. The non-transitory machine-readable medium of claim 1, wherein the substitute data comprises global horizontal irradiance (GHI) sensor data and/or diffuse sensor data from the PV system that is converted to POAI data.

7. The non-transitory machine-readable medium of claim 1, wherein the substitute data comprises diffuse irradiance sensor data from an external PV system and global horizontal irradiance (GHI) sensor data from the external PV system that is converted to POAI data.

8. The non-transitory machine-readable medium of claim 1, wherein the substitute data is estimated based on a POAI fill model.

9. The non-transitory machine-readable medium of claim 1, wherein the substitute data is estimated based on a satellite POAI model.

10. An anomaly detection system, comprising:

a non-transitory machine-readable medium for storing machine executable instructions; and a processor core for accessing the machine executable instructions and executing the machine executable instructions as operations, the operations comprising:

determining, via analyzing plane of array irradiance (POAI) sensor data from a POAI sensor of a photovoltaic (PV) system with a trained classifier, that the POAI sensor data corresponds to a scenario of a set of scenarios, wherein the set of scenarios comprises a sensor anomaly scenario and one or more of a clear sky scenario, an overcast scenario, or a mix of sun and cloud scenario, and the sensor anomaly scenario characterizes a decreased effectiveness of the POAI sensor; and in response to determining that the POAI sensor data corresponds to the sensor anomaly scenario:

generating an alert that indicates a sensor anomaly at the PV system; and replacing the POAI sensor data with substitute data.

11. The anomaly detection system of claim 10, wherein the PV system is one of a single axis tracker PV system or a fixed axis PV system.

12. The anomaly detection system of claim 10, wherein the sensor anomaly is one of a tracker failure of the POAI sensor, an obstruction shading the POAI sensor, snow or debris on the POAI sensor, or a malfunction of the POAI sensor.

13. A method comprising:

determining, via analyzing plane of array irradiance (POAI) sensor data from a POAI sensor of a photovoltaic (PV) system with a trained classifier, that the POAI sensor data corresponds to a scenario of a set of scenarios, wherein the set of scenarios comprises a sensor anomaly scenario and one or more of a clear sky scenario, an overcast scenario, or a mix of sun and cloud scenario, and the sensor anomaly scenario characterizes a decreased effectiveness of the POAI sensor; and in response to determining that the POAI sensor data corresponds to the sensor anomaly scenario:

generating an alert that indicates a sensor anomaly at the POAI sensor; and replacing the POAI sensor data with substitute data.

14. The method of claim 13, wherein the PV system is one of a single axis tracker PV system or a fixed axis PV system.

15. The method of claim 13, wherein the sensor anomaly is one of a tracker failure of the POAI sensor, an obstruction shading the POAI sensor, snow or debris on the POAI sensor, or a malfunction of the POAI sensor.

16. The method of claim 13, wherein the substitute data comprises global horizontal irradiance (GHI) sensor data and/or diffuse sensor data from the PV system that is converted to POAI data.

* * * * *